(12) United States Patent
Glenn et al.

(10) Patent No.: US 7,088,391 B2
(45) Date of Patent: Aug. 8, 2006

(54) COLOR VIDEO CAMERA FOR FILM ORIGINATION WITH COLOR SENSOR AND LUMINANCE SENSOR

(75) Inventors: William E. Glenn, Ft. Lauderdale, FL (US); John W. Marcinka, Lighthouse Point, FL (US)

(73) Assignee: Florida Atlantic University, Boca Raton, FL (US)

( * ) Notice: Subject to any disclaimer, the term of this patent is extended or adjusted under 35 U.S.C. 154(b) by 676 days.

(21) Appl. No.: 09/954,969

(22) Filed: Sep. 17, 2001

(65) Prior Publication Data

US 2002/0101523 A1    Aug. 1, 2002

Related U.S. Application Data

(63) Continuation-in-part of application No. 09/653,983, filed on Sep. 1, 2000, now Pat. No. 6,891,568.

(60) Provisional application No. 60/314,209, filed on Aug. 22, 2001, provisional application No. 60/232,947, filed on Sep. 15, 2000, provisional application No. 60/232,945, filed on Sep. 15, 2000, provisional application No. 60/171,361, filed on Dec. 22, 1999, provisional application No. 60/151,965, filed on Sep. 1, 1999.

(51) Int. Cl.
*H04N 5/225* (2006.01)
*H04N 9/68* (2006.01)
*H04N 5/335* (2006.01)

(52) U.S. Cl. .................... 348/262; 348/238; 348/236; 348/273

(58) Field of Classification Search ................ 348/238, 348/262, 236, 305; 359/305
See application file for complete search history.

(56) References Cited

U.S. PATENT DOCUMENTS

| 3,603,723 | A | * | 9/1971 | Tan ............................ 348/238 |
| 4,107,732 | A | | 8/1978 | Adcock et al. ............. 348/238 |
| 4,274,107 | A | * | 6/1981 | Tamura et al. ........... 348/225.1 |
| 4,611,243 | A | | 9/1986 | Morisawa et al. .......... 348/342 |
| 4,853,787 | A | | 8/1989 | Kurth ......................... 348/341 |
| 4,876,591 | A | * | 10/1989 | Muramatsu ................. 348/236 |
| 5,014,123 | A | * | 5/1991 | Imoto ......................... 358/506 |
| 5,023,723 | A | | 6/1991 | Date et al. .................. 348/337 |
| 5,379,069 | A | * | 1/1995 | Tani ...................... 348/333.11 |
| 5,523,785 | A | * | 6/1996 | Muramoto ................. 348/254 |
| 5,673,124 | A | * | 9/1997 | Kaji et al. ................... 358/474 |
| 5,805,217 | A | | 9/1998 | Lu et al. ..................... 348/273 |
| 5,914,750 | A | | 6/1999 | SanGregory et al. ....... 348/368 |
| 6,078,681 | A | * | 6/2000 | Silver ......................... 382/133 |
| 6,100,929 | A | | 8/2000 | Ikeda et al. ................. 348/262 |
| 6,295,087 | B1 | * | 9/2001 | Nohda ........................ 348/234 |
| 6,356,379 | B1 | * | 3/2002 | Kreymerman .............. 359/305 |

(Continued)

OTHER PUBLICATIONS

W.E. Glenn et al., "Logarithmic A/D Converters Used in Video Signal-Processing Systems" pp. 329-333, SMPTE Journal, May 1992.

*Primary Examiner*—Ngoc-Yen Vu
*Assistant Examiner*—James M. Hannett
(74) *Attorney, Agent, or Firm*—Martin Novack

(57) ABSTRACT

A technique for producing electronic video signals representative of color images of a scene includes use of a regular CCD for the color channel and a back-thinned CCD for a luminance channel; a technique for deriving blue and reconstructing full resolution R, G, B from full resolution white and a red and green checkerboard pattern; and a technique for deriving an automatic gain control signal using an unshielded white area on the CCD to obtain a white reference.

12 Claims, 4 Drawing Sheets

U.S. PATENT DOCUMENTS

| | | | |
|---|---|---|---|
| 6,529,640 B1 * | 3/2003 | Utagawa et al. | 382/284 |
| 6,577,341 B1 | 6/2003 | Yamada et al. | 348/272 |
| 6,605,820 B1 * | 8/2003 | Isoda et al. | 250/586 |
| 6,614,471 B1 * | 9/2003 | Ott | 348/238 |

* cited by examiner

US 7,088,391 B2

COLOR VIDEO CAMERA FOR FILM ORIGINATION WITH COLOR SENSOR AND LUMINANCE SENSOR

RELATED APPLICATIONS

This is a continuation-in-part of U.S. Patent Application Ser. No. 09/653,983 filed Sep. 1, 2000 now U.S. Pat. No. 6,891,568,(which claims priority from U.S. Provisional Patent Application No. 60/151,965, filed Sep. 1, 1999 and from U.S. Provisional Patent Application No. 60/171,361, filed Dec. 22, 1999). The present Application also claims priority from the following three U.S. Provisional Patent Applications, which are incorporated herein by reference: U.S. Provisional Patent Application No. 60/232,945, filed Sep. 15, 2000; U.S. Provisional Patent Application No. 60,232,947, filed Sep. 15, 2000; U.S. Provisional Patent Application No. 60/314,209, filed Aug. 22, 2001.

FIELD OF THE INVENTION

This invention relates to a color video camera system that can be utilized for motion picture film origination.

BACKGROUND OF THE INVENTION

This invention relates to a color video camera system that can be utilized for motion picture film origination.

Color motion pictures are often made by shooting the action with a film camera, converting the images to digital form, computer processing the digital images, and then scanning the processed images back onto film for release. It would be advantageous to have a practical electronic color video camera that could directly shoot the action to obtain color video from which good quality color motion picture film could ultimately be produced, but this has not yet been achieved. A major reason is that the expensive high quality lenses used in motion picture film cameras have optical characteristics and requirements that are not readily adaptable to electronic video cameras. A 24 frames per second progressively scanned color video camera for electronic film origination has become available. It is a three-sensor camera that must use lenses designed for television cameras, and cannot achieve the image quality that is obtainable with the high quality lenses used in motion picture film cameras.

It is among the objects of the present invention to devise an electronic color video camera that can utilize the types of high quality lenses that are used in motion picture color film cameras.

It is among the further objects of the invention to provide an electronic video camera and method that can provide improved operation with variable frame rate information and that is adaptable for using a RAID recorder to store variable frame rate information.

It is also among the objects of the invention to provide an electronic video camera and method that provides improved operation using certain color filter patterns and a technique which employs an improved gain control.

SUMMARY OF THE INVENTION

In accordance with an embodiment of the method disclosed in the parent Application hereof (U.S. Ser. No. 09/653,983), there is set forth a technique for producing electronic video signals representative of color images of a scene, comprising the following steps: providing a luminance sensor and a color sensor having a color filter thereover; providing a beamsplitter, and providing a motion picture film camera type of lens system that focuses light from the image, via the beamsplitter, onto the luminance sensor and the color sensor; and producing electronic video signals from outputs of the luminance sensor and the color sensor. In an embodiment thereof, the step of providing a color sensor having a color filter thereover comprises providing a color sensor with a two-color checkerboard filter pattern, preferably red and green.

Features of the present invention include: use of a regular CCD for the color channel and a back-thinned CCD for the luminance channel; use of a red and green checkerboard pattern for the color channel filter; a technique for deriving blue and reconstructing full resolution R, G, B from full resolution white and the red and green checkerboard pattern; a technique for deriving an automatic gain control (AGC) signal using an unshielded white area on the CCD to obtain a white reference; diagonal binning of the signals from a color (red/green) checkerboard pattern; and a technique for using a RAID recorder to store variable frame rate information.

Further features and advantages of the invention will become more readily apparent from the following detailed description when taken in conjunction with the accompanying drawings.

DETAILED DESCRIPTION

Figure 1:
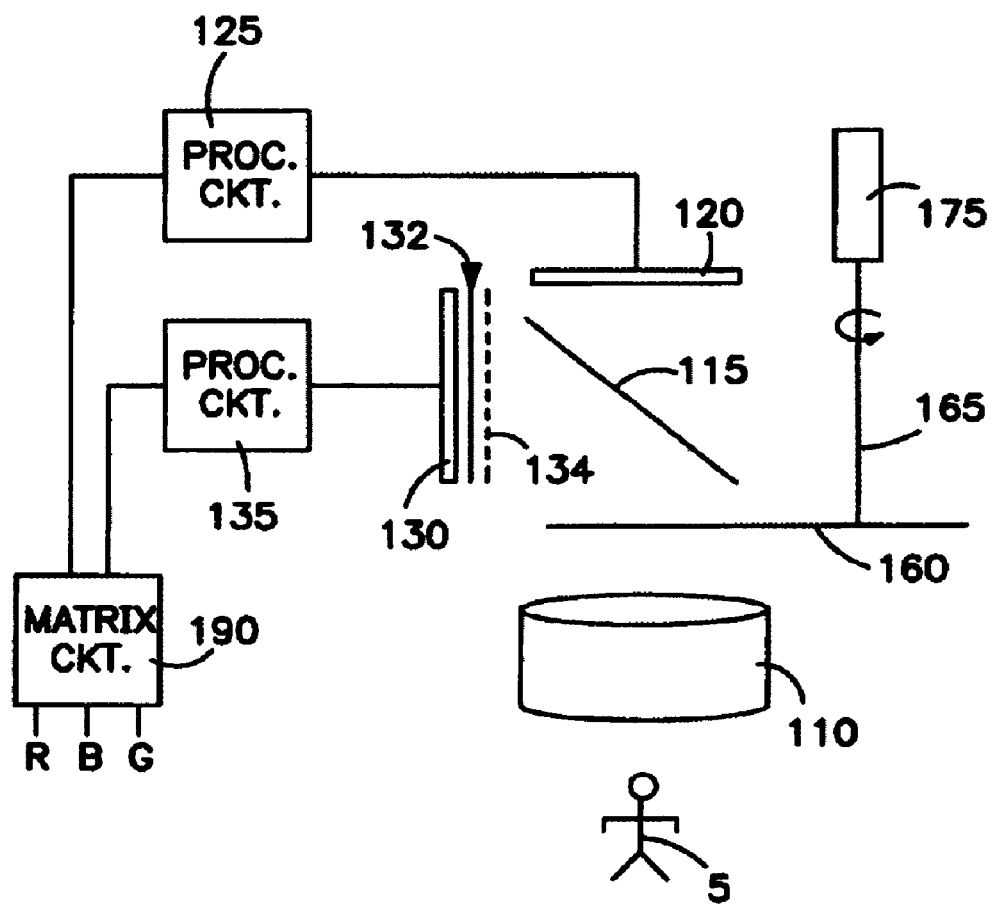
FIG. 1 shows a camera system in accordance with an embodiment in the parent application.

FIG. 1 shows a camera system in accordance with an embodiment in the parent application hereof. Light received from a scene 5 being viewed (typically, a moving scene) is received and focused by a motion picture film camera type of lens, represented in the Figure by lens 110, which is typically a multi-element lens or lens system. [As used herein, the term "lens system" is intended to generically cover a lens of one or more elements as well as a system of lenses. The term "lens" is sometimes used as convenient shorthand for a lens system.] Light focused by the lens is divided, in a manner described further hereinbelow, by a pellicle beamsplitter 115, for incidence on sensors 120 and 130 which may be, for example, suitable CCD sensors. In this embodiment, the sensor 120 is a luminance (Y) sensor, and the sensor 130 is provided with a color pattern filter 132 and serves as a color sensor. (The image on the color sensor is reversed, and can be electronically reversed back on readout). Each sensor is coupled with suitable processing circuitry (labeled 125 in the luminance channel and labeled 135 in the color channel), including color detect and matrix circuitry 190 in the color channel, and suitable filtering in both channels. The signals can be combined and matrixed, as represented by the block 140 to obtain, for example, R, G, B, and/or color difference signals and luminance. Reference can be made, for example, to copending U.S. patent application Ser. No. 09/152,395 and copending U.S. patent application Ser. No. 09/362,603, both assigned to the same assignee as the present invention, and both disclosing aspects of two channel processing. It will be understood that a number of features of the invention do not depend on a particular processing approach.

One of the advantages of the embodiment being described is that it can employ high quality camera lenses designed for motion picture film cameras. The camera system of FIG. 1 is a two-sensor system with some special characteristics that permit use of such lenses. Typically the high quality lenses designed for motion picture film cameras have a relatively short back throw (less than about 1.5 times the image width) that is incompatible with the optical path length associated with the splitter (e.g. dichroic prism) of a three sensor camera. The present embodiment employs a pellicle splitter (115) that avoids the need for, say, the glass prism. The motion picture film camera lenses are not corrected for the aberrations introduced by the glass path and the two rather than three sensor design shortens the back throw behind the lens so that the motion picture film camera type of lenses (which have a relatively short back throw) can be used.

Figure 2:
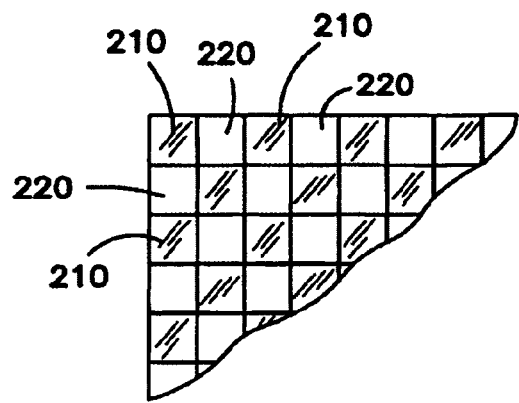
FIG. 2 illustrates a checkerboard pattern.

In a form of the invention as set forth in the parent Application, the pellicle has a dichroic coating on it that passes a spectrum that makes the output from the Y sensor have the spectral distribution appropriate for Y. The remaining light is mostly red and blue. In an embodiment hereof, the color filter 132 of FIG. 1 employs red and blue diagonally sampled filters. This is shown in FIG. 2, which illustrates a checkerboard pattern having cross-hatched boxes 210 representative of red, and non-cross-hatched boxes 220 representative of blue. This provides a diagonally sampled red and blue color output. The horizontal and vertical resolution of these colors is consequently the same as the luminance resolution. However, the diagonal resolution is half that of the luminance diagonal resolution. This is acceptable since there is normally less detail in the diagonal directions in images and the human visual system has less color acuity on the diagonal. Using this filter, R-Y and B-Y can be derived from the signals from the two sensors. The Y signal is obtained from the luminance sensor 120. In this embodiment, R, B, and Y are gamma corrected before subtracting. This gives a signal that is very close to log R/Y and log B/Y, which are isoluminant color signals. This has a considerable advantage over color difference signals that are produced from a Y signal that is derived from the sum of gamma corrected R, G, and B (which is not isoluminant). The only disadvantage is that to derive green, one must first obtain gamma corrected R and B signals by adding gamma corrected Y to the color signals and then the R, B, and Y signals must be un-gamma corrected to give linear signals before subtracting the appropriate proportions of R and B from Y to get green. The green then needs to be gamma corrected. Reference can be made to W. E. Glenn et al., Logarithmic A/D Converters Used In Video Signal Processing Systems, SMPTE Journal, 101/5, May, 1992. By using diagonally sampled R and B signals, the horizontal resolution and vertical resolution of R and B are the same as Y. The diagonal resolution, however, is half the diagonal resolution of Y, which is 1.4 times its horizontal resolution. The combination of a diagonally sampled two color sensor (rather than a 3 color sensor) combined with isoluminant color signals will give improved rendition of brightness in saturated colors. This is an advantage for "blue screen" processing.

In a further embodiment of the FIG. 2 color filter, the checkerboard passes red and green; i.e., for example, the boxes 210 being red and the boxes 220 being green. This embodiment has the advantage of having blue (rather than green) be the derived color, since the derived color will have the lowest signal-to-noise ratio, and this can be best tolerated in the blue.

In reading out the checkerboard patterns, the R and G (or R and B) images in the checkerboard pattern can be decimated (e.g. by setting odd pixels to zero on line 1 (and all odd lines) and even pixels to zero on line 2 (and all even lines). Interpolation can be used to obtain the missing pixels. The luminance channel signal can be appropriately filtered to obtain a lower resolution luminance signal for derivation and processing in the color channel.

Because of the reduced diagonal resolution that results from the color patterns, it is desirable to use an optical pre-filter to avoid a color moiré pattern being visible when there is detail on the diagonal. One form of an optical prefilter, represented at 134 in FIG. 1, is a phase diffraction grating. In conjunction with the diagonal color filter pattern, an arrangement of two gratings oriented with grating lines at 45 degrees (that is, diagonally oriented) with respect to the sensor. The gratings can be pressed replica gratings after the optimum grating spacing and amplitude have been determined. A phase grating with adjustable amplitude can be produce using the patterned alignment process described in U.S. Pat. No. 5,638,201. Alternatively, adjustable phase grating can be produced in a glass plate using Bragg diffraction of an ultrasonically driven plate. The ultrasound frequency and amplitude will determine the grating spacing and amplitude.

Figure 3:
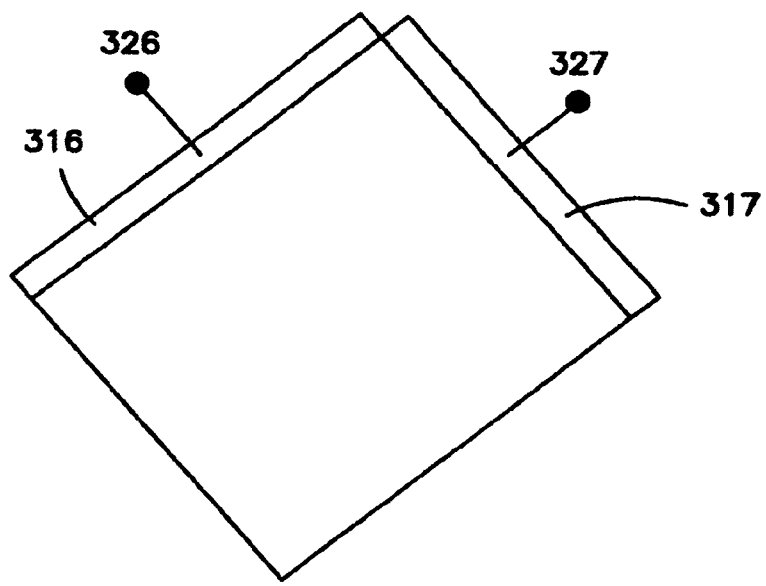
FIG. 3 shows an ultrasonic low pass filter.

In accordance with an embodiment set forth in the parent Application hereof, the beam splitting pellicle (preferably plastic, although other materials can be used) can be utilized as an adjustable opto-acoustical low pass filter, as disclosed in copending U.S. patent application Ser. No. 09/455,884, assigned to the same assignee as the present Application. As described therein, ultrasonic excitation can be applied to edge transducers, for example to produce controlled low pass optical filtering of the image reflected toward the color sensor 130 with the color pattern 132 thereon. In this case, to match the diagonal pattern of the checkerboard color filter, the FIG. 3 arrangement can be used, with the transducers diagonally oriented with respect to the vertical and horizontal reference directions of the image. The pellicle is represented at 115A and the transducers 316 and 317 have excitation applied at terminals 326 and 327, respectively. This will result in diagonally oriented waves in the pellicle that achieve the desired optical prefiltering without an additional component.

Figure 4:
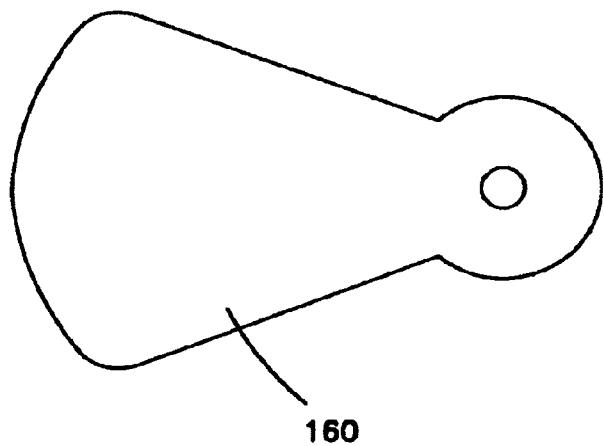
FIG. 4 shows an embodiment of a shutter.

Depending on the type of sensor used, a shutter may be required to cut off the light during charge transfer from the light sensing area to the storage area. [For background regarding use of a shutter, see U.S. Pat. No. 4,667,226.] This would only require about 1.5 ms, but should preferably be longer. A shorter exposure time improves motion blur for moving objects. In FIG. 1, a mechanical shutter 160 is driven on shaft 165 by motor 175. An embodiment of the shutter is shown in FIG. 4.

Figure 5:
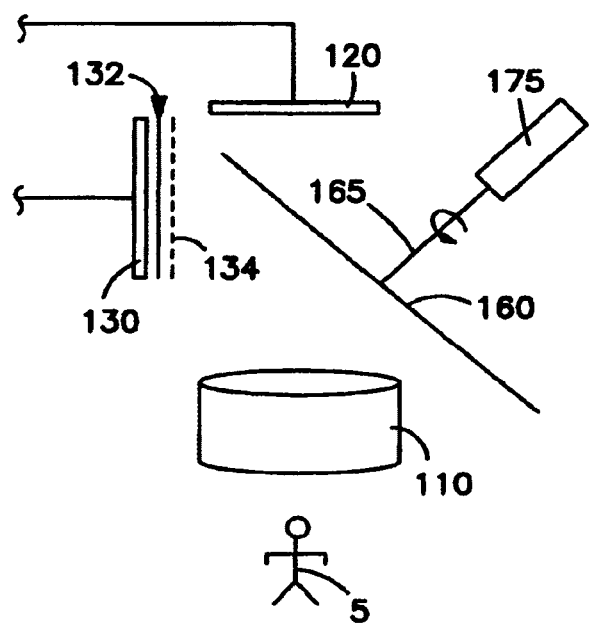
FIGS. 5 and 6 show further embodiments with a mechanical shutter.
Figure 6:
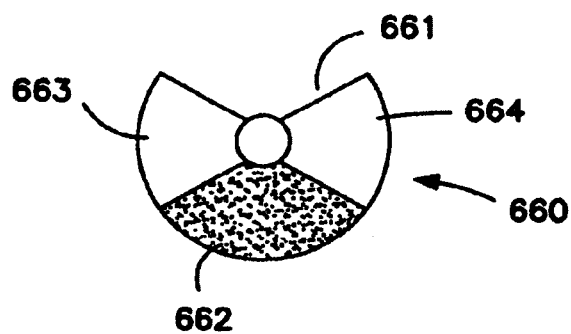

A further embodiment of a mechanical shutter is shown in FIGS. 5 and 6. In this case, the shutter (660) is in the usual position of a splitter, that is at a diagonal with respect to the image direction. The shutter 660 is driven by motor 175 to rotate with the shaft 165. The layout of shutter 660, which is actually a rotating combination shutter/mirror, is shown in FIG. 6, and it has on open sector 661 which opposes a dark opaque sector 662, as well as opposing mirror (reflective) sectors 663 and 664. The vertical transfer to the storage registers occurs when the dark sector of the shutter is over the lens. The open section exposes the Y sensor 120 and two mirror sections expose the color sensor 130. This produces a color exposure on either side temporally of the luminance exposure. Color is temporally longer but centered in time coincident with the Y exposure.

In an embodiment set forth above, luminance (Y) is sensed on one channel, and the color signals red (R) and green (G) are sensed on alternate pixels on the other channel. The sensor is capable of clocking out 60 FPS progressive with 1920×1080 pixels. In an embodiment hereof, one always clock out at this same clock frequency. The camera will actually run at frame rates from 120 FPS to 1 FPS. The mechanized shutter can cover this frequency range. The frame transfer CCD will shift the information into the storage area when the shutter is closed. The information will then be clocked out of the storage area in either 1/60 or 1/20 second. There will then be an interval until the next frame is clocked out which depends on the frame rate.

For frame rates between 60 FPS and 120 FPS, the frame is clocked out in 1/120 of a second at 1920×540-line resolution. In order to use the same output clock frequency, two lines are "binned" into the horizontal register before being shifted out. For binning in the normal way, the stripe pattern of the color CCD would have to be vertical stripe filters that alternate between red and green. A preferred filter, as in Appendix 1, uses a checkerboard pattern of red and green. In order to bin the same color out, and in accordance with a feature hereof, the binning is done diagonally. In normal binning, two vertical shifts are used before the horizontal register is clocked out. For diagonal binning, one vertical shift is followed by one horizontal shift followed by another vertical shift before the horizontal register is clocked out. This is disclosed in the above referenced U.S. Provisional Application that was filed on Aug. 22, 2001.

In accordance with a feature hereof, the variable frame rate information can be recorded on a recorder, such as a RAID recorder, using the following technique: As indicated, the camera is capable of outputting 60 FPS progressive at 1080×1920 resolution. It can also output 540×1920 at 120 FPS. In all cases, the output clock rate will be 148 MHz on two 10 bit parallel channels. Y on one channel and R, G on alternate pixels on the other. One can always use the same clock frequency with 1/60 sec or 1/20 sec frames. There will be an interval between frames that can be varied to get variable input frame rates to the recorder. 1/120 sec frames can be used for frame rates between 120 FPS and 60 FPS. 1/60 sec frames can be used for frame rates from 60 FPS to 1 FPS. The recorder output will always run at 24 FPS at a clock rate of 59.2 MHz. This can be downloaded into a digital tape recorder.

The output of the RAID recorder needs further processing to develop Y, $C_R$, $C_B$, for recording on a tape recorder. For one thing, B needs to be derived from Y, R, G. Also, isoluminant processing is used to derive R, B, G from Y, $C_R$, $C_B$. This is partly due to the fact that Y is gamma corrected after the linear addition of R, G, B in the luminance CCD. Also, isoluminant processing gives much better contrast for detail in saturated colors.

It may be desirable to simply record Y, R, G on the tape recorder rather than Y, $C_R$, $C_B$ and then do the isoluminant processing to derive R, G, B from its output. A reason for using R and G instead of R and B is that the color CCD will probably be front illuminated. CCDs of this type have poor blue sensitivity. The Y sensor will probably be back thinned (back illuminated). This gives it better sensitivity as well as a flat response over the entire visible spectrum. The blue sensitivity will be about four times that of the color CCD.

In accordance with another feature hereof, a back-thinned (and back-illuminated) CCD is used as a luminance sensor and either another back-thinned CCD or a conventional (front-illuminated) CCD is used as a color sensor. The back-thinned CCD has approximately equal very high sensitivity for all colors. The conventional front illuminated CCD has very poor blue sensitivity and the red and green sensitivity is down over one f stop from a back-thinned version. The color filter can be a two color checkerboard pattern, as in FIG. 2. As indicated, the CCD for the color channel can be either a front-illuminated or back-illuminated CCD. The registration is harder for color filters on the back side. Backside sensors have more diffusion of light. This could cause cross talk between the colors. In any case it is an advantage to use red and green filters on the color sensor and derive blue from a backside white sensor. When one uses isoluminant color processing it is better to use white (equal sensitivity for all colors) rather than photopic Y. The poor blue sensitivity if a front illuminated color CCD is used is not a problem if the filter colors are red and green. One color must be derived from the combination of two colors and white. The derived color will have a slightly worse S/N ratio. Blue can tolerate that better than green or red. Isoluminant processing is described in my Paper, Logarithmic A/D Converters Used In Video Signal Processing Systems. However, in accordance with a feature hereof, white is preferable to photopic Y for the process. The following describes the procedure for deriving blue and reconstructing full resolution R, G, B from full resolution white and a checkerboard pattern on the color CCD for red and green.

1. Store the white exposure (no optical filter). Adjust the color of light so that R, G, B patches on the color bar chart are equal amplitude. Adjust the f stop so that the white patch is one V.

2. Store the red exposure (optical filter 4V). Use a red filter on the light source. Adjust the f stop so that the white patch is one V.

3. Store the green exposure (optical filter 4V). Use a green filter on the light source. Adjust the f stop so that the white patch is one V.

4. Take the gamma out of all 3 signals to produce linear signals.

5. Decimate R & G images in a checkerboard pattern. (Set odd pixels to zero on line one and even pixels to zero on line two for red. Set even pixels to zero on line one and odd pixels to zero on line two for green.)

6. Interpolate a value for the missing pixels in both red and green from the four surrounding pixels. This now produces low resolution R & G images ($R_L$, and $G_L$).

7. Digitally filter the white exposure with a low-pass filter to produce a white image the same resolution as the low resolution R & G images. To check this filter you can make a red exposure with no optical filter and digitally filter it. If you now subtract the $R_L$ signal the result should be zero. From the white exposure you now have the high resolution white $W_H$ and a low resolution white $W_L$.

8. Derive and store a low resolution blue ($B_L$). This is done by subtracting $R_L$ & $G_L$ from $3 \times W_L$. ($B_L = 3W_L - R_L - G_L$). Before doing this check a gray scale to make sure $W_L$, $R_L$ & $G_L$ track from zero to 1 volt. Adjust the black level and gain to make them track.

9. Add the gamma back and display an image with gamma corrected $R_L$, $G_L$, $B_L$ to make sure everything is O.K. so far.

10. Multiply $R_L$, $G_L$ and $B_L$ by $W_H/W_L$ to produce $R_H$, $G_H$ & $B_H$. The $W_H/W_L$ signal will blow up near black if the noise in $W_H$ is bigger than $W_L$. It is probably a good idea to use some "coring" on the $W_H$ signal to make sure this doesn't happen. This improves the perceived S/N ratio anyhow. To add "coring" you add 10 to $W_L$ and multiply $R_L$, $G_L$, $B_L$ by 0.9.

11. Put the gamma back in the $R_H$ $G_H$ $B_H$ signals and display a high resolution image. The MTF should now be the same for R, G, B signals as the $W_H$ signal. However, detail edges in saturated colors should be the same color as the low resolution color image.

In accordance with another feature hereof, a reference white is used on both sensors to provide an automatic gain control (AGC) signal to keep the gain constant. In a frame transfer CCD there is a storage area that is shielded from light. Normally there are a few lines of active area under the shield. These black lines can be used as a black level reference to keep the black level constant. In accordance with a feature hereof, an unshielded couple of lines is left at the opposite end of the storage area to provide a white reference. In a frame transfer CCD this area can be illuminated with a pulse of light from an LED during vertical blanking. In that way it does not reduce the contrast ratio of the image as the charge is shifted through this area for readout. There is frequently a shift in gain with temperature of the CCD and circuit. Signal is clocked out from several sectors in parallel. A minute gain shift between sectors is highly visible. With feedback from this line, the gain can be held constant. The reason for putting the line at the opposite end of the storage area from the active area is to make it possible to get good isolation for the reference light from the active image area.

The invention claimed is:

1. A method for producing electronic video signals representative of color images of a scene, comprising the steps of:
    providing a luminance sensor and a color sensor having a color filter thereover, said color filter having only two colors, in a red-green checkerboard filter pattern;
    providing a beamsplitter, and providing a lens system that focuses light from said scene, via said beamsplitter, onto said luminance sensor and said color sensor; and
    producing electronic video signals from outputs of said luminance sensor and said color sensor;
    said step of producing video signals from the output of said color sensor including diagonal binning of the signals from said color sensor to obtain a red color signal and a green color signal.

2. The method as defined by claim 1, wherein said diagonal binning includes clocking out of said color sensor using alternating horizontal and vertical shifts.

3. The method as defined by claim 1, wherein said step of producing video signals from the outputs of said luminance sensor and said color sensor includes deriving a blue color signal from the output of said luminance sensor and said red and blue color signals.

4. The method as defined by claim 2, wherein said step of producing video signals from the outputs of said luminance sensor and said color sensor includes deriving a blue color signal from the output of said luminance sensor and said red and blue color signals.

5. The method as defined by claim 3, wherein said step of producing video signals further includes decimating and interpolating said red and green color signals to obtain low resolution red and green color signals, filtering said luminance signals to obtain a low resolution white signal, and deriving a low resolution blue color signal from said low resolution white signal and said low resolution red and green color signals.

6. The method as defined by claim 4, wherein said step of producing video signals further includes decimating and interpolating said red and green color signals to obtain low resolution red and green color signals, filtering said luminance signals to obtain a low resolution white signal, and deriving a low resolution blue color signal from said low resolution white signal and said low resolution red and green color signals.

7. The method as defined by claim 5, wherein said step of producing video signals further includes deriving high resolution red, green, and blue color signals from said low resolution red, blue, and green signals and said luminance signal.

8. The method as defined by claim 6, wherein said step of producing video signals further includes deriving high resolution red, green, and blue color signals from said low resolution red, blue, and green signals and said luminance signal.

9. The method as defined by claim 3, wherein said step of providing a lens system comprises providing a motion picture film camera type of lens system.

10. The method as defined by claim 4, wherein said step of providing a lens system comprises providing a motion picture film camera type of lens system.

11. Apparatus for producing electronic video signals representative of color images of a scene, comprising:
    a luminance sensor and a color sensor having a color filter thereover, said color filter having only two colors, in a red-green checkerboard filter pattern; a beamsplitter, and a lens system that focuses light from said image, via said beamsplitter, onto said luminance sensor and said color sensor; and
    means for producing electronic video signals from outputs of said luminance sensor and said color sensor.

12. Apparatus as defined by claim 11, wherein said lens system comprises a motion picture film camera type of lens system.

* * * * *